No. 625,371. Patented May 23, 1899.
S. WALKER.
TUBULAR JOINT.
(Application filed Sept. 8, 1898.)
(No Model.)

Witnesses
Ernest W. Jones
C Hayward Powell

Inventor
SAMUEL WALKER
per Charles T Powell
ATTORNEY

UNITED STATES PATENT OFFICE.

SAMUEL WALKER, OF BIRMINGHAM, ENGLAND.

TUBULAR JOINT.

SPECIFICATION forming part of Letters Patent No. 625,371, dated May 23, 1899.

Application filed September 8, 1898. Serial No. 690,510. (No model.)

*To all whom it may concern:*

Be it known that I, SAMUEL WALKER, a subject of the Queen of Great Britain, residing at 29 Hendon road, Sparkbrook, in the city of Birmingham, England, have invented new and useful Improvements in Tubular Joints, (for which I have made an application for patent in Great Britain under No. 3,324, bearing date February 10, 1898,) of which the following is a specification.

My invention relates to improvements in tubular joints; and its object is to provide an improved form of joint for connecting tubes to the lugs of cycles or the like vehicles. I attain such object by the means illustrated in the accompanying drawings, in which—

Figure 2:
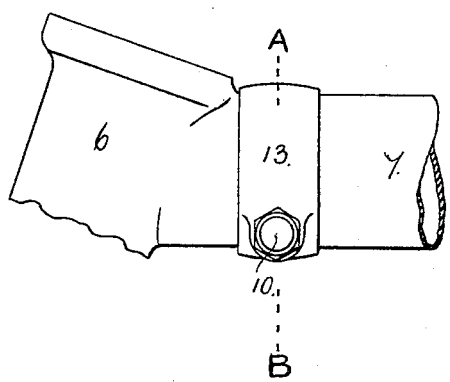
Figure 1:
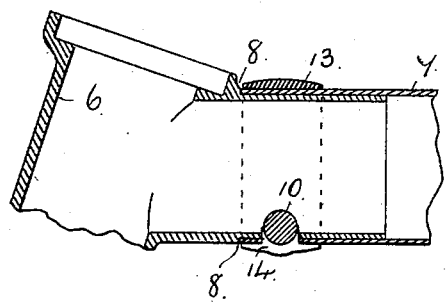
Figure 3:
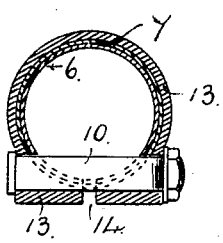
Figure 4:
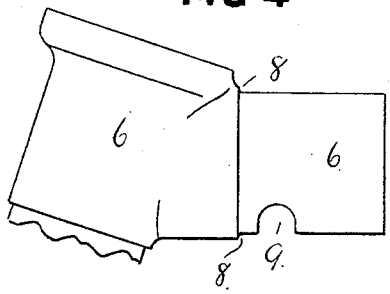
Figure 5:
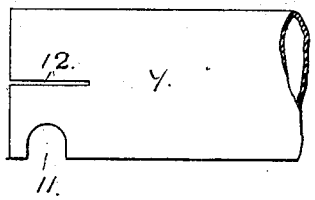

Figure 1 shows in section this my invention as applied to a cycle-lug. Fig. 2 is a view in elevation of my invention. Fig. 3 is a sectional view of the invention on line A B, Fig. 2. Fig. 4 is a view in elevation of the junctional fitting as prepared for the attachment of the tube. Fig. 5 shows the tube ready for attachment to the junctional fitting.

Similar numbers refer to similar parts throughout the several views.

6 is the junctional fitting, which may be tubular or solid. The outer surface for a given distance from its end is reduced in diameter to a depth equal to the thickness of the tube 7, so that the latter may be passed thereon up to and against the shoulder 8. Thus the exterior diameter of the lug is equal to that of the tube, so as to form a flush joint.

In the under side of the fitting 6 the cross-gap 9 is made to accommodate the clamping screw-pin 10, as hereinafter described, and in the under side of the tube 7 the cross-gap 11 is made to agree with the gap 9, so that when placed together in position they shall coincide with each other. The tube 7 may, if desired, have one or more slits 12 made for a short distance along its length, but generally I find this not to be necessary.

13 is a clip which encircles the tube 7, having the gap 14 and the screw-pin 10 passing through the clip and through the gaps 9 and 11, so that when the latter is firmly screwed up the whole is very rigidly bound together, thus forming a secure tubular joint without brazing or similar methods now in use and is also detachable at will.

It will of course be readily seen that the fitting 6 may be substituted by any other part to which it is desired to attach a tube.

What I claim as my invention, and desire to secure by Letters Patent, is—

In brazeless tubular joints the combination of lug 6, having a reduced outer surface with shoulder 8, tube 7, fitted upon the outside of lug, with clip 13, having bolt 10, passing through gaps 9 and 11, substantially as set forth and shown and for the purposes specified.

SAMUEL WALKER.

Witnesses:
WILLIAM HENRY BUTLER,
C. HAYWARD POWELL.